United States Patent [19]
Fields

[11] Patent Number: 5,329,114
[45] Date of Patent: Jul. 12, 1994

[54] ACTUATOR WITH AN OPTICAL POSITION SENSOR USING LINEAR ATTENUATORS

[75] Inventor: Christopher V. Fields, Riviera Beach, Fla.

[73] Assignee: United Technologies Corporation, Hartford, Conn.

[21] Appl. No.: 997,721

[22] Filed: Dec. 31, 1992

[51] Int. Cl.⁵ .................... H01J 40/14; G01D 5/34
[52] U.S. Cl. .................... 250/214 PR; 250/227.21; 250/231.13
[58] Field of Search ............ 250/561, 227.21, 227.23, 250/214 PR, 231.13

[56] References Cited

U.S. PATENT DOCUMENTS

| | | | |
|---|---|---|---|
| 1,985,044 | 12/1934 | Lyle | 250/214 PR |
| 3,328,595 | 6/1967 | Todd, Jr. | 250/231.13 |
| 4,320,293 | 3/1982 | Guretzky | 250/214 PR |
| 4,977,316 | 12/1990 | Malcolm et al. | 250/231.13 |
| 5,107,846 | 4/1992 | Atlas | 250/227.21 |
| 5,210,409 | 5/1993 | Rowe | 250/227.21 |

OTHER PUBLICATIONS

G. E. Miller, ISA Transactions, vol. 26 No. 1, "Fiber Optic Control of Jet Aircraft Engines" pp. 11-17, 1987.

*Primary Examiner*—David C. Nelms
*Assistant Examiner*—Stephone B. Allen
*Attorney, Agent, or Firm*—Robert E. Greenstien

[57] ABSTRACT

An actuator having an optical position sensor is disclosed. The sensor remotely provides via a single optic fiber light having two spectral frequencies of about equal intensities to two inversely acting linear optical attenuators. The attenuated light from each attenuator is filtered. The two attenuated light signals of the two frequencies are combined in another single optic fiber and then processed into voltages indicative of their intensities. The position of a moving object attached to the attenuators is derived from the two signals.

19 Claims, 6 Drawing Sheets a b c d

ACTUATOR WITH AN OPTICAL POSITION SENSOR USING LINEAR ATTENUATORS

DESCRIPTION

1. Technical Field

This invention relates generally to actuators, in particular actuators using optical position sensors.

2. Background of the Invention

An actuator used in jet engine and aircraft control systems needs to reliably and precisely sense the position of the object that it controls. Often, a position sensor (transducer) is connected to the actuator to accomplish these functions. When an actuator is used in a jet engine or aircraft control system the sensor sends a signal to a location outside the actuator for display in the cockpit or for processing by electronic controls. Some sensors used in these applications use electromagnetic devices that transmit their output signals as voltages. More recently, optical position sensors using optic fibers for signal transmission have found favor because of their lower weight and insensitivity to disturbance from strong electromagnetic interference.

One type of electromagnetic sensor provides two voltage signals related to the motion of the object being sensed. A first voltage signal ($V_1$) increases linearly with the motion of the object in a first direction, while a second voltage signal ($V_2$) decreases linearly with motion of the object in the same direction. If the sum of the two signals, $V_1 + V_2$, is constant, then the position P of the object relative to a fixed point is determined by:

$$K\left(\frac{V_1 - V_2}{V_1 + V_2}\right).$$

where K is a scaling constant.

DISCLOSURE OF THE INVENTION

An object of this invention is providing precision position control of an object constrained to motion in one dimension.

It is another object of this invention to provide an actuator having an optical position sensor that is light weight in comparison to electronic sensors.

It is another object of the invention to provide an actuator having a position sensor that is resistant to disturbance from electromagnetic interference, making it particularly suitable to applications in jet aircraft.

It is another object of this invention to provide an optical position sensor that is temperature stable.

According to the invention, broadband light is applied from a common optical line through a pair of linear attenuators first connected to an object. As the object moves in one direction, the intensity of light passing thru one attenuator increases as the attenuation of light passing thru the other decreases. The light from each attenuator is filtered to a particular color (e.g. frequency range), and the filtered light from each attenuator is applied to a second common optical line. The second line extends to a detector that provides two electrical signals, each indicative of the intensity of the light of one of the colors. The signals are processed to determine the position of the object.

According to the invention, a processor provides the output signal as a function of the first and second signals, according to the equation:

$$P = \frac{K(R_1 - R_2)}{(R_1 + R_2)}. \tag{1}$$

where P is the output signal, K is a scaling constant, $R_1$ is the first signal and $R_2$ is the second signal. Although the intensity of the source light may change, the ratio in equation 1 does not change for a given object position P because $R_1$ and $R_2$ both scale with the source light intensity.

According to the invention, the attenuators are located on a surface that slides in a tube. An alignment surface attached to the surface guides the motion of the surface in the tube.

According to the invention, the alignment surface also contains a second pair of attenuators, to provide redundancy.

A feature of the present invention is that the position signal does not vary with changes in the intensity of the light source.

Another feature of the present invention is that the position signal does not vary with changes in attenuation inherent in the optic connectors that are located between the optic position sensor and the processor because each of the light frequencies are attenuated equally by the optical connectors.

Other objects, benefits and features of the invention will be apparent from the following discussion of one or more embodiments.

DETAILED DESCRIPTION OF THE INVENTION

Figure 1:
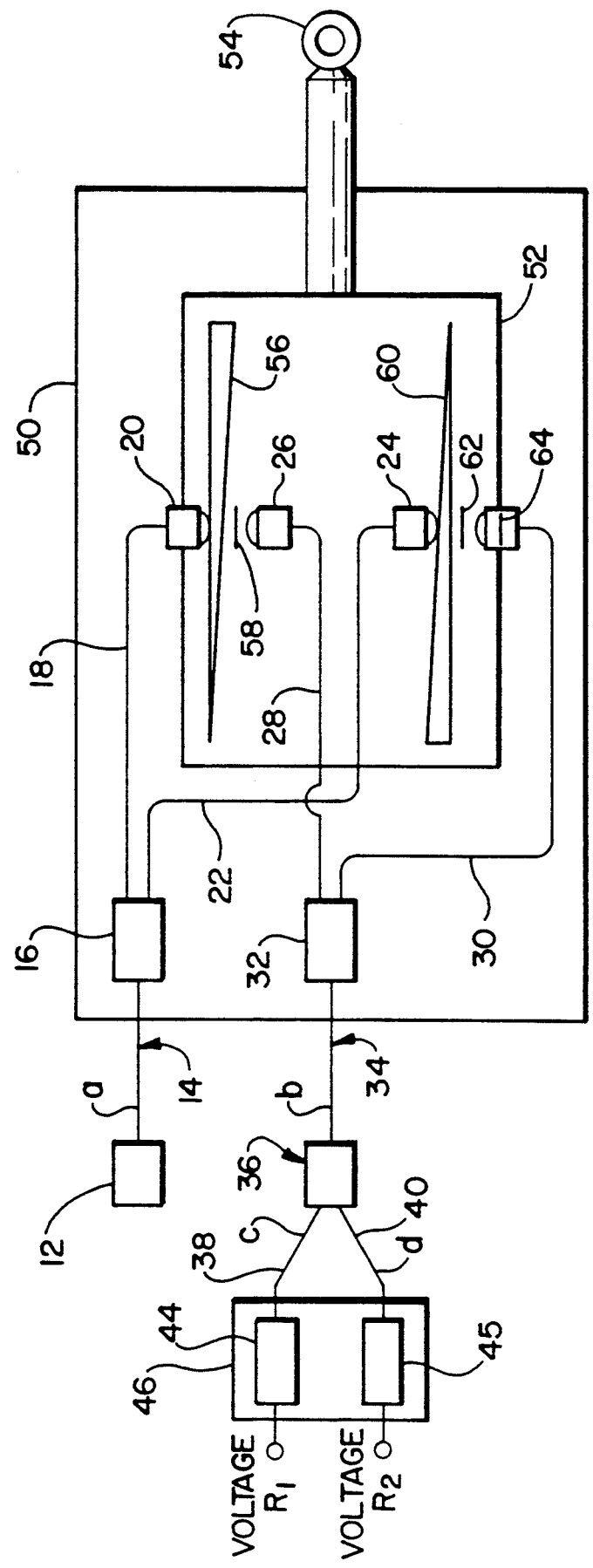
FIG. 1 is a schematic of an actuator system embodying the present invention.

Referring to FIG. 1, an actuator 50 is at a fixed position. A slide plate 52 is attached to an object 54, e.g. a jet engine or aircraft part, that is controlled by the actuator. A light source 12, such as a light emitting diode (LED), is positioned outside the housing (not shown) of the actuator 50. LEDs having a broad spectral intensity maximum are preferred because it is easy to find two different narrow frequency bands, f1 and f2, having about the same intensity. A single optical fiber 14 carries light from the source 12 to a light splitter 16. The splitter 16 may be located on or within the actuator 50.

The splitter 16 divides the light input from the optic fiber 14 into a first light path 16.1 and a second light path 16.2. The first light path 16.1 has optic fiber 18 having one end connected to the splitter 16 and the other end connected to illuminating head 20. The second light path 16.2 has optic fiber 22 having one end connected to the splitter 16 and the other end connected to illuminating head 24. Each illuminating head is positioned such that it provides light at a fixed point within the actuator 50. Elongated, linear optical attenuators 56, 60 are located on slide plate 52 that slides back and forth in front of illuminating heads 20, 24 with the motion of object 54. The attenuators 56, 60 are positioned oppositely such that one attenuation increases as the other decreases for a given direction of motion of the object 54. Attenuated light passes through frequency filters 58, 62 that permit only light having about frequencies f1 and f2, respectively, to pass through. Attenuated, filtered light illuminates receiving heads 26, 64 at other fixed points within the actuator 50. From the receiving heads 26, 64, the light is carried to light combiner 32 by optic fibers 28, 30. The combiner 32 may be located within the actuator 50.

The illuminating heads 20, 24 have graduated index of refraction (GRIN) lenses for broadening the light illuminating the attenuators 56, 60. The receiving heads 26, 64 also have GRIN lenses for narrowing the beams of attenuated, filtered light onto optic fibers 28, 30.

Light from combiner 32 is carried to a dichroic splitter 36 located remotely from the actuator by an optic fiber 34. The dichroic splitter divides the light from the combiner 32 into the separate frequency components f1 and f2. The two frequency components, f1 and f2, are separately fed onto separate optic detectors 44 and 45 in a signal processor 46 via optic fibers 38 and 40. The processor 46 converts the inputed light signals into two voltage signals, R1 and R2, proportional to the intensity of light of frequencies f1 and f2, respectively. Using known computer signal processing (e.g. a microprocessor), the processor 46 then derives the position of the object 54 using, for example, equation 1, above.

Figure 2:
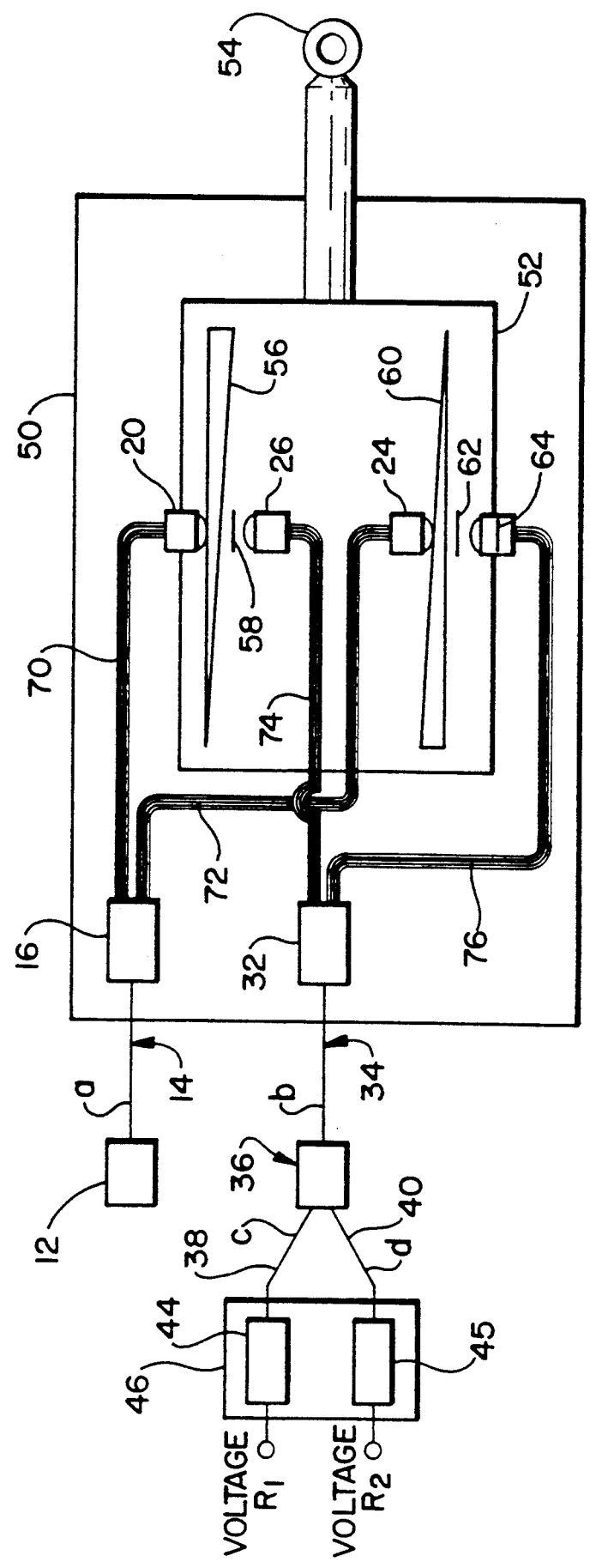
FIG. 2 is a schematic of an actuator using a second embodiment of the present invention.
Figure 4:
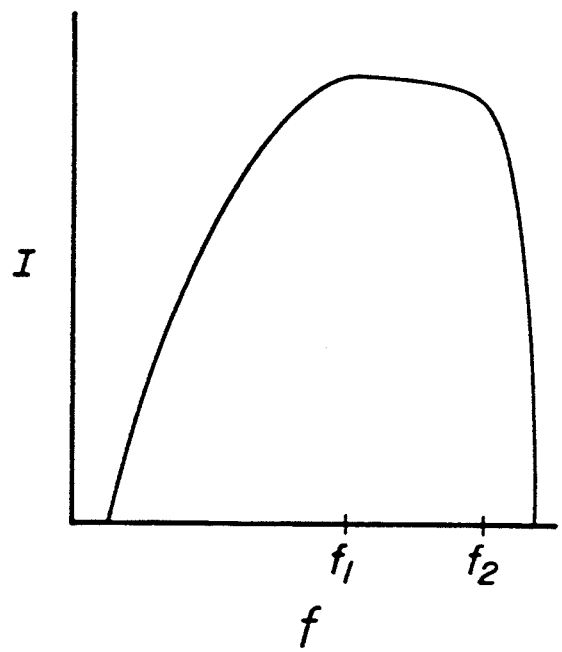
FIG. 4 shows plots of light intensity as a function of frequency of the light signals at different optical locations in the motion sensor shown in FIG. 1 and 2.
Figure 4:
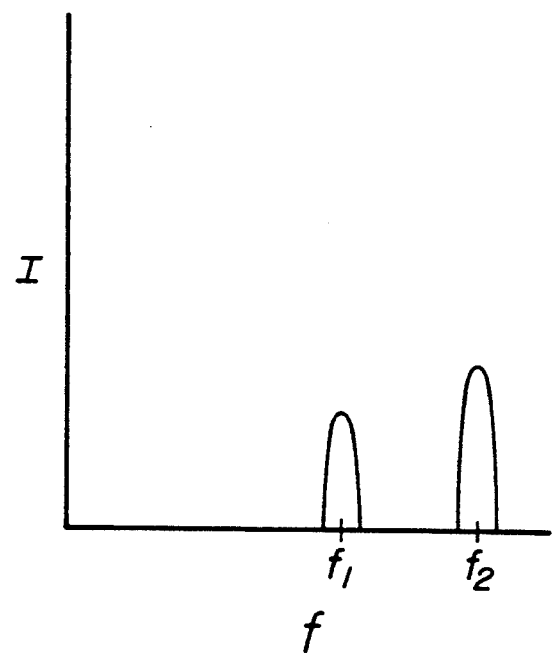
Figure 4:
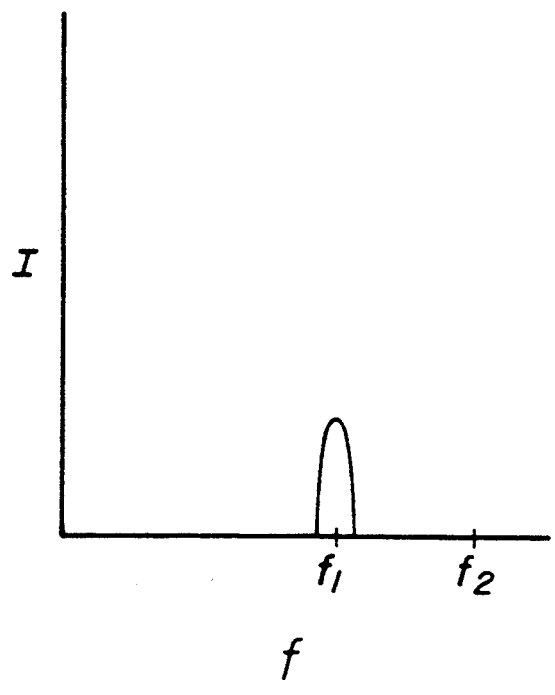
Figure 4:
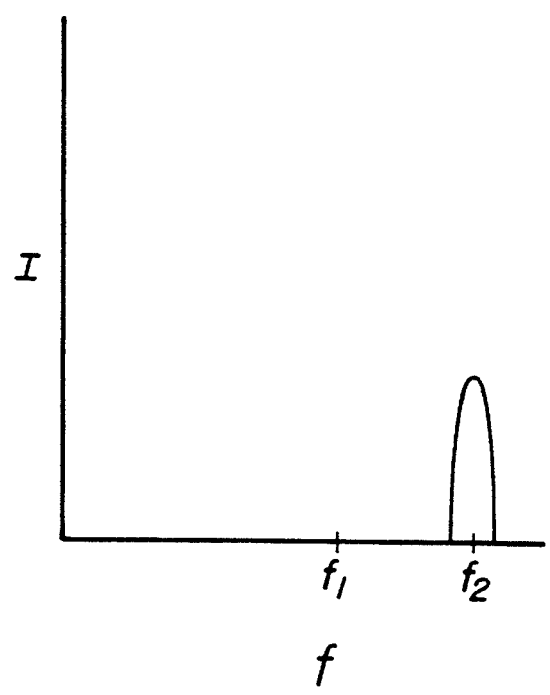

FIG. 4 shows four plots of intensity vs. frequency at locations a, b, c and d indicated in FIGS. 1 and 2. FIG. 4a shows the frequency spectrum of light radiated by the light source 12. FIG. 4b shows the frequency spectrum of the light returning from actuator 50 in line 34. FIG. 4c shows the frequency spectrum of the light impinging on optic detector 44 and FIG. 4d shows the frequency spectrum of light falling on optical detector 45.

Figure 3:
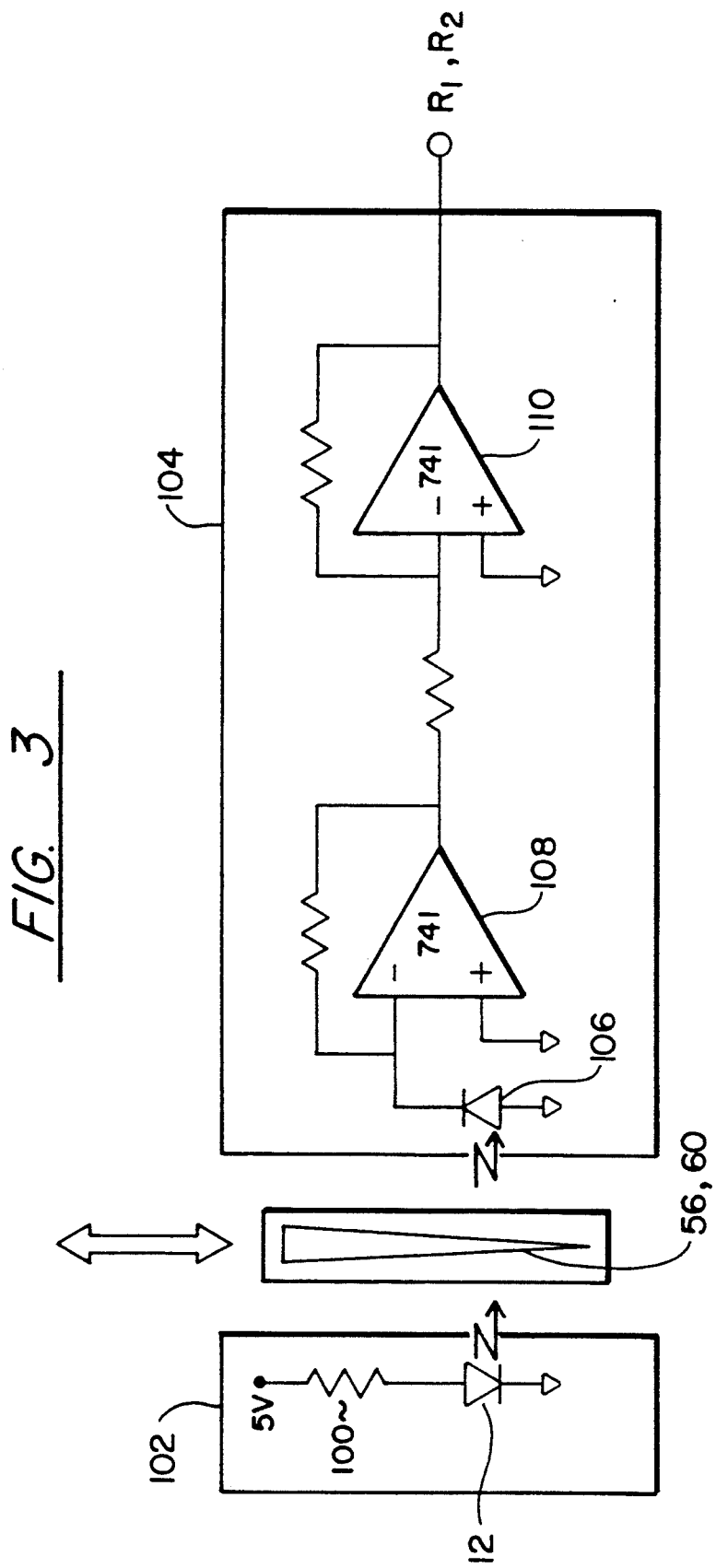
FIG. 3 is functional block diagram of an optical sensor with a linear attenuator.

FIG. 3 shows a schematic of the opto-electronics for a single frequency channel. There, the light source means 102 comprises a LED 12. The processor 104 comprises a light sensitive diode 106 and transistors 108, 110.

A second embodiment of this invention is displayed in FIG. 2. The optic fibers 18, 22, 28 and 30 are in this case replaced by bundles of optic fibers 70, 72, 74 and 76, respectively. However, optic fibers 14 and 34 remain single fibers in all embodiments. This assures that the intensities of both light frequencies, f1 and f2, illuminating the attenuators will scale together, regardless of variations in the source light intensity or dirt in the optic fiber connections outside the attenuator.

Figure 5:
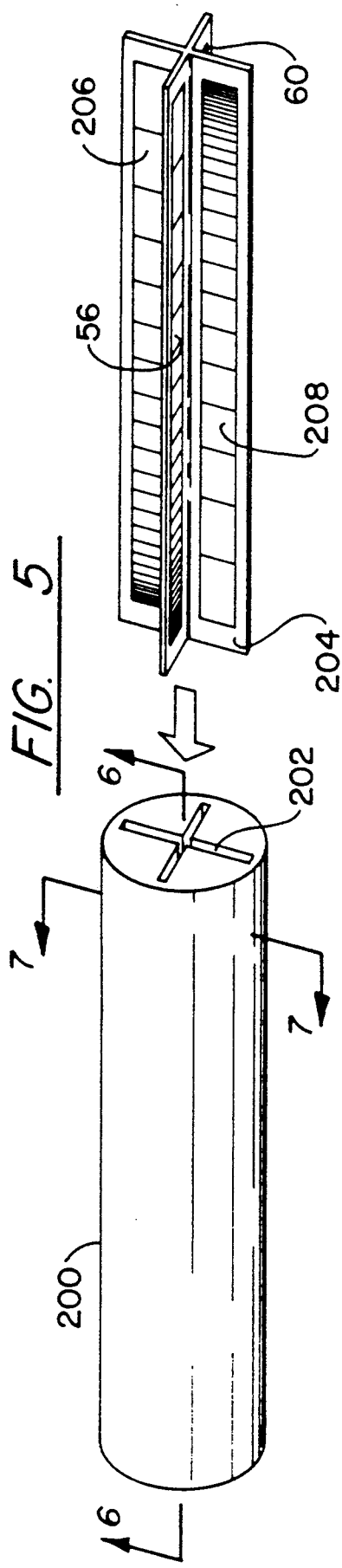
FIG. 5 is an exploded perspective of a sensor body, guide plate and attenuators.

In jet engine and aircraft control system applications, it is important to have redundant systems. FIG. 5 displays part of a sensor having two pairs of attenuators for redundancy. A cylindrical sensor body 200 has a longitudinal slot 202 extending for most of its length. The slot 202 has a cross shaped cross section. The slide member 204 having the two pairs of attenuators 206, 208 and 56, 60 mounted on it also has a cross shaped cross section.

Figure 7:
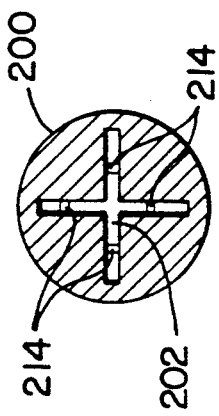
FIG. 7 is a section along the line 7—7 in FIG. 5.
Figure 6:
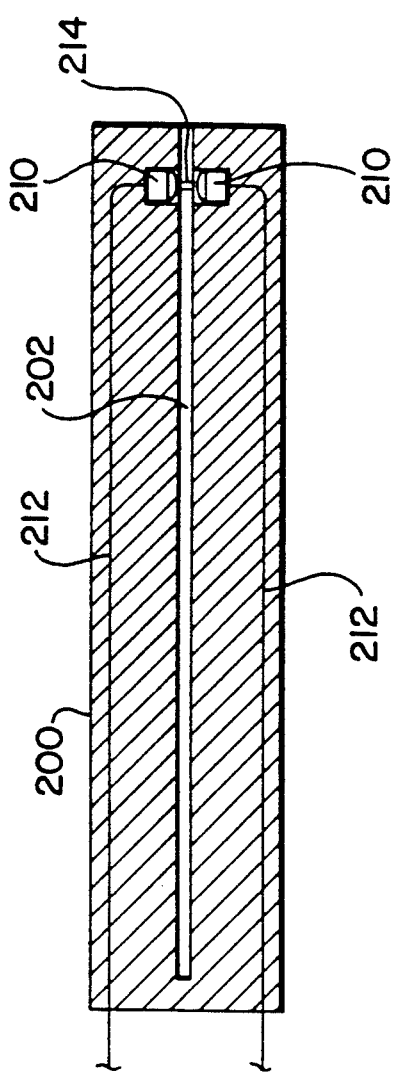
FIG. 6 is a section along the line 6—6 in FIG. 5.

FIGS. 6 and 7 show that the illuminating heads 210 and receiving heads 216 are all located at the same axial position in the sensor body 200. The light paths 214 for this type of attenuator cross the arms of the slot.

Figure 8:
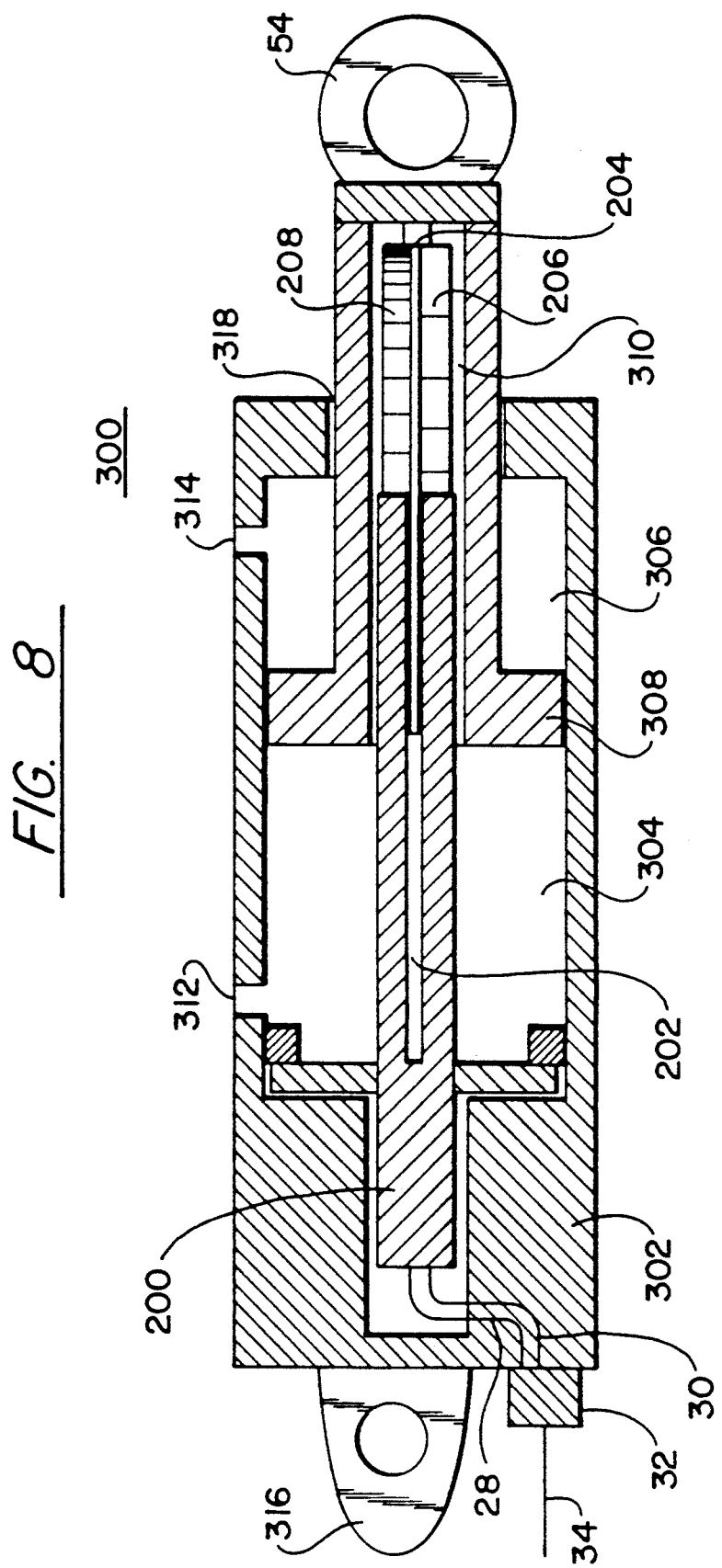
FIG. 8 is a cross section of an actuator of this invention embodying the sensor shown in FIG. 5.

The sensor body 200 and slide plate 204 of the type shown in FIG. 5 can be mounted in existing actuators, as shown in FIG. 8. The actuator 300 has a housing 302 having a cylindrical chamber within it. The actuator is attached to a non-moving part of the engine or aircraft by a fastener 316. The chamber is divided by a sliding piston 308 into a first subchamber 304 and a second subchamber 306. The subchambers 304, 306 are filled with a nonopaque hydraulic fluid, such as oil. Subchambers 304 and 306 communicate with hydraulic systems (not shown) via ports 312 and 314 respectively. The piston 308 extends outside the housing 302 through an opening 318 at one end, and attaches to the moving object 54. The piston 308 has an axial bore 310 extending most of its length. The slide plate 204 having the attenuators 206, 208, 56, 60 mounted on it is attached to the end wall of the bore 310. The sensor body 200 is attached to the end wall of the first subchamber 304 opposing the piston 308. The sensor body 200 extends into the piston bore 310, its slot 202 slidably engaging the slide plate 204 as the piston 308 moves.

There are numerous possible variations of elongated, linear optical attenuators for attenuators 56, 60, 206, 208. Among them are: optical gratings with variable line spacings; elongated, wedge shaped slots; elongated, tapered, optical obstructions; attenuators having a first polarizing material having a first polarization angle and a second polarizing material having a second polarization angle, characterized in that the angle between the first polarization angle and the second polarization angle varies along the length of each attenuator; elongated wedge shaped reflective surfaces; and reflective surfaces with reflectivity that varies with length.

In addition to the foregoing, one skilled in the art may be able to make modifications and variations in whole or in part, to the previously explained embodiments without departing from the true scope and spirit of the invention.

I claim:

1. An actuator comprising sensor means for indicating the position of an object constrained to move in one dimension between first and second positions, characterized by:

light source means for illuminating a first point and a second point with equal intensity light comprising a first frequency and a second frequency different from the first frequency, the first and second frequencies having about equal intensity;

first attenuation means for illuminating with variable intensity a third point with light originating from the first point, the intensity of the illumination at the third point linearly decreasing with a change of position of the object in a first direction;

second attenuation means for illuminating with variable intensity a fourth point with light originating from the second point, the intensity of the illumination at the fourth point linearly decreasing with a change of position of the object in a second direction opposite the first direction and in synchronism with an increase in illumination at the third point;

receiver means for providing a first signal indicative of the intensity of light of the first frequency illuminating the third point and a second signal indicative of the intensity of light of the second frequency illuminating the fourth point; and processing means for providing a third signal indicative of the position of the object as a function of the first and second signal.

2. The actuator of claim 1, further characterized in that the first and second attenuation means each comprise an elongated, linear optical attenuator connected to the object, oriented parallel to the direction of motion, and having length L and attenuation per unit length A.

3. The actuator of claim 2, further characterized in that the light source means comprises:
a light source;
a light splitter connected to the light source by a first optic fiber;
a second optic fiber connected at a first end to the light splitter for carrying light to the first point; and
a third optic fiber connected at a first end to the light splitter for carrying light to the second point.

4. The actuator of claim 3, further characterized in that the light source means further comprises:
a first illuminating head connected to a second end of the second optic fiber for broadening light illuminating the first point; and
a second illuminating head connected to a second end of third optic fiber for broadening light illuminating the second point.

5. The actuator of claim 4, further characterized in that the first and second illuminating heads each comprise a graduated index of refraction lens.

6. The actuator of claim 2, further characterized in that the receiver means further comprises:
combining means for combining light illuminating the third point with light illuminating the fourth point to form a combined light signal; and
dichroic means for producing the first and second signal from the combined light signal.

7. The actuator of claim 6, further characterized in that the receiver means further comprises:
a fourth optic fiber connected at a first end to the combining means for carrying light from the third point to the combining means;
a fifth optic fiber connected at a first end to the combining means for carrying light from the fourth point to the combining means; and
a sixth optic fiber connecting the dichroic means and the combining means.

8. The actuator of claim 7, further characterized in that the receiver means further comprises:
a first receiving head for narrowing the light illuminating the third point connected to a second end of the fourth optic fiber; and
a second receiving head for narrowing the light illuminating the fourth point connected to a second end of the fifth optic fiber.

9. The actuator of claim 8, further characterized in that the first and second receiving heads each comprise a graduated index of refraction lens.

10. The actuator of claim 2, further characterized in that the sensor means is further characterized by:
a first filter means for permitting only light of about the first frequency to illuminate the third point, located in a first light path defined by the first point, the first attenuator means and the third point; and
a second filter means for permitting only light of about the second frequency to illuminate the fourth point, located in a second light path defined by the second point, the second attenuator means and the fourth point.

11. The actuator of claim 2, further characterized in that the attenuators each comprise optical gratings with variable line spacings.

12. The actuator of claim 2, further characterized in that the attenuators each comprise elongated, wedge shaped slots.

13. The actuator of claim 2, further characterized in that the attenuators each comprise elongated, tapered, optical obstructions.

14. The actuator of claim 2, further characterized in that the attenuators each comprise a first polarizing material having a first polarization angle and a second polarizing material having a second polarization angle, the angle between the first polarization angle and the second polarization angle varying along the length of each attenuator.

15. The actuator of claim 2, further characterized in that the attenuators each comprise an elongated, wedge-shaped reflective surface.

16. The actuator of claim 2, further characterized in that the attenuators each comprise a reflective surface with a reflectivity that varies along the length of each attenuator.

17. An actuator comprising a sensor for indicating the position of an object constrained to move a maximum distance L1 in one dimension, wherein the sensor means is characterized by:

a. a sensor body comprising an opening at a first end and a longitudinal slot extending within the sensor body from the opening, the slot having a uniform cross section and length L2 at least as great as L1;

b. first and second spaced apart, elongated, linear optical attenuators attached to the object and capable of sliding within the slot, the attenuators being the same length, oriented antiparallel to each other and having the same attenuation per unit length;

c. a light source remote from the sensor body and capable of providing light characterized by first and second wavelengths having about equal intensities, the second wavelength being different from the first wavelength;

d. a light splitter comprising a splitter input connected to the light source by a single source optic fiber, a first splitter output connected to a first splitter output optic fiber and a second splitter output connected to a second splitter output optic fiber;

e. a first illuminator head located in the sensor body at a first predetermined longitudinal position of the slot and connected to the first splitter output optic fiber for illuminating the first attenuator with light originating from the light source;

f. a second illuminator head located in the sensor body at the first pre-determined longitudinal position of the slot spaced apart from the first illuminator head and connected to the second splitter output optic fiber for illuminating the second attenuator with light originating from the light source;

g. a first receiver head located in the sensor body at a second predetermined longitudinal position of the slot and connected to a first receiver optic fiber for receiving light attenuated by the first attenuator;

h. a second receiver head located in the sensor body at the second predetermined longitudinal position of the slot spaced apart from the first receiver head and connected to a second receiver optic fiber for receiving light attenuated by the second attenuator;

i. first filter means for filtering light illuminating the first receiver head to about the first wavelength;

j. second filter means for filtering light illuminating the second receiver head to about the second wavelength;

k. a light combiner comprising a first combiner input connected to the first receiver optic fiber for receiving illumination of the first wavelength from the receiver head, a second combiner input connected to the second receiver optic fiber for receiving illumination of about the second wavelength from the second receiver head and a combiner output connected to a combiner output optic fiber;

l. a dichroic splitter located remote from the sensor body comprising a dichroic splitter input connected to the combiner output optic fiber, a first dichroic splitter output connected to a first dichroic splitter output optic fiber for providing light of only about the first wavelength and a second dichroic splitter output connected to a second dichroic splitter output optic fiber for providing light of only about the second wavelength; and m. processor means connected to the first and second dichroic splitter output optic fibers for providing a first electrical signal indicative of the intensity of light input from the first dichroic splitter output optic fiber and for providing a second electrical signal indicative of the intensity of light input from the second dichroic splitter output optic fiber.

18. The actuator of claim 17, characterized in that the first and second illuminators each comprise lenses for broadening the light received from the splitter optic fibers and illuminating the attenuators, and characterized in that the first and second receiver heads each comprise GRIN lenses for directing the attenuated light received by the receiver heads into the receiver optic fibers.

19. The actuator of claim 17, characterized in that the sensor further comprises processor means for providing a third electrical signal indicative of the position of the object as a function of the first and second electrical signals.

* * * * *